(12) United States Patent
Fang et al.

(10) Patent No.: US 10,192,321 B2
(45) Date of Patent: Jan. 29, 2019

(54) MULTI-STYLE TEXTURE SYNTHESIS

(71) Applicant: ADOBE INC., San Jose, CA (US)

(72) Inventors: Chen Fang, Sunnyvale, CA (US);
Zhaowen Wang, San Jose, CA (US);
Yijun Li, Merced, CA (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/409,321

(22) Filed: Jan. 18, 2017

(65) Prior Publication Data

US 2018/0204336 A1 Jul. 19, 2018

(51) Int. Cl.
*G06T 15/04* (2011.01)
*G06T 7/40* (2017.01)
*G06T 11/00* (2006.01)
*G06T 5/50* (2006.01)
*G06F 3/0482* (2013.01)

(52) U.S. Cl.
CPC .............. *G06T 7/40* (2013.01); *G06F 3/0482* (2013.01); *G06T 5/50* (2013.01); *G06T 11/001* (2013.01)

(58) Field of Classification Search
CPC ........................ G06T 7/40; G06T 2207/20081
USPC ......................................................... 345/582
See application file for complete search history.

(56) References Cited

U.S. PATENT DOCUMENTS 8,321,422 B1* 11/2012 Kwatra .................. G06F 17/18
382/103

| 2008/0020363 | A1* | 1/2008 | Chang | G09B 5/00 434/308 |
| 2010/0238160 | A1* | 9/2010 | Yea | G06T 3/0093 345/419 |
| 2015/0262392 | A1* | 9/2015 | Park | G06T 11/001 345/441 |
| 2015/0332438 | A1* | 11/2015 | Lin | G06T 5/002 382/159 |
| 2017/0365093 | A1* | 12/2017 | Stacey | G06T 17/05 |

OTHER PUBLICATIONS

Gatys et al., "Texture Synthesis Using Convolutional Neural Networks", Advances in Neural Information Processing Systems, NIPS, pp. 262-270, 2015a.

(Continued)

*Primary Examiner* — Thomas J Lett
(74) *Attorney, Agent, or Firm* — Brake Hughes Bellermann LLP

(57) ABSTRACT

Systems and techniques that synthesize an image with similar texture to a selected style image. A generator network is trained to synthesize texture images depending on a selection unit input. The training configures the generator network to synthesize texture images that are similar to individual style images of multiple style images based on which is selected by the selection unit input. The generator network can be configured to minimize a covariance matrix-based style loss and/or a diversity loss in synthesizing the texture images. After training the generator network, the generator network is used to synthesize texture images for selected style images. For example, this can involve receiving user input selecting a selected style image, determining the selection unit input based on the selected style image, and synthesizing texture images using the generator network with the selection unit input and noise input.

20 Claims, 9 Drawing Sheets

(56) References Cited

OTHER PUBLICATIONS

Johnson et al., "Perceptual Losses for Real-Time Style Transfer and Super-Resolution", arXiv:1603.08155v1 [cs.Cv] Mar. 27, 2016.
Simonyan et al., "Very deep convolutional networks for large-scale image recognition.", arXiv preprint arXiv:1409.1556, 2014.
Ulyanov et al., "Texture Networks: Feed-forward Synthesis of Textures and Stylized Images", Proceedings of the 33rd International Conference on Machine, Learning, New York, NY, USA, 2016. JMLR: W&CP vol. 48.

* cited by examiner

MULTI-STYLE TEXTURE SYNTHESIS

TECHNICAL FIELD

This disclosure relates generally to systems and techniques used to create and edit images and more particularly relates to creating images with texture that is similar to the texture of another image.

BACKGROUND

In image creation and editing, it is often desirable to synthesize an image that shares similar texture with another image. "Texture" refers to the visually recognizable characteristics that occur based on a pattern or other spatial arrangement of color in an image. For example, images of a brick wall, a stone pathway, and a leaf covered forest floor each include spatial arrangements of colors that result in visually recognizable characteristics. Two images can have similar texture but differ with respect to other characteristics. For example, an image of a brick wall with bricks of consistent size, color, shape, boundaries, and relationship to one another can have a similar texture to an image that shows bricks in which brick boundaries, shapes, colors, sizes, and relationships are less regular.

Various techniques are used to synthesize an image that has a similar texture to another image. The synthesized image is referred to herein as the "texture image" and the other image, that is the source of the texture, is referred to herein as the "style image." Some existing techniques involve training a generator neural network to synthesize a texture image that is similar to a style image. The techniques generally use a generator network that is specific to a single style image. Thus, synthesizing texture images for multiple style images requires training and using multiple generator networks. In addition, the techniques often fail to synthesize sufficiently variable results for a given style image. For example, the texture images that are synthesized to be similar to a style image of a brick wall tend to be very similar to one another. This limits the variety of texture image results that can be provided to a user who is looking for variations of a particular style image.

SUMMARY

Systems and techniques are disclosed that synthesize an image with similar texture to a selected style image. A generator network is trained to synthesize texture images depending on a selection unit input. The training configures the generator network to synthesize texture images that are similar to individual style images of multiple style images based on which of the multiple style images is selected by the selection unit input. The generator network can be configured to minimize a covariance matrix-based style loss and/or diversity loss in synthesizing the texture images. Minimizing the covariance matrix-based style loss ensures that the texture of a texture image result will be similar to the texture of the selected style image. Minimizing the diversity loss ensures that the texture image results differ from one another. After training the generator network, the generator network allows users to synthesize texture images for selected style images. For example, this can involve receiving user input selecting a selected style image of the multiple style images, determining the selection unit input corresponding to the selected style image, and synthesizing one or more texture images using the generator network with the selection unit input and noise input. The texture images will have a texture that is similar to the texture of the selected style image.

These illustrative features are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
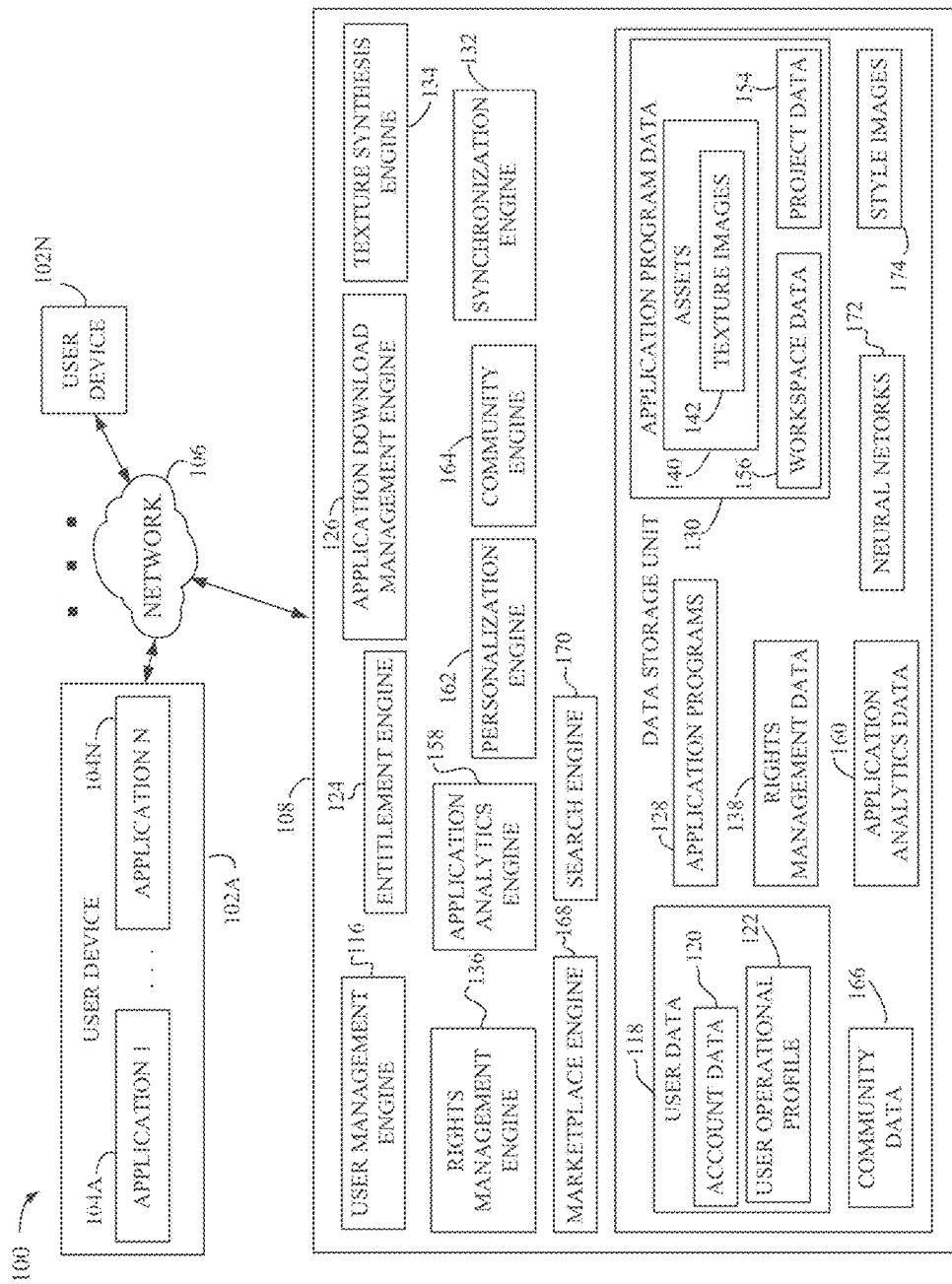
FIG. 1 is a diagram of an environment in which one or more techniques of the invention can be practiced.

The techniques disclosed herein use neural networks to synthesize a texture image that shares similar texture with a selected style image. The techniques use a random noise input to generate texture image results that have similar texture to the selected style image but that are also different from one another. A generator neural network is trained to use a selection of a style image to synthesize different texture images. The generator neural network is referred to herein as the "generator network." Unlike prior techniques, techniques disclosed herein configure a single generator network to synthesize texture images that are similar to one of multiple style images. A user is able to select a style image from a set of multiple style images and then synthesize results similar to that style image using the generator network. For example, the user can select a style image of a brick wall to synthesize texture images with a brick wall texture and later select a style image of a stone path to synthesize texture images with a stone path texture. A single generator network is used to synthesize both the results with the brick wall texture and the results with the stone path texture. Using a single generator network to synthesize texture images similar to a selected style of multiple styles eliminates the need to train one generator network for each style image. It also reduces the storage and processing requirements for synthesizing texture images for multiple style images.

Techniques disclosed herein facilitate using a single generator network to synthesize texture images that are similar to a selected style image of multiple style images. These techniques are used individually or in combination in various embodiments of the invention. One technique configures a generator network with a selection unit input. The selection unit input allows a user selection of one style image of a set of style images to guide the texture image synthesis. The user's selection is provided as input to the generator network. For example, if the user selects a style image of a brick wall, this selection is provided to the generator network as the selection unit input and the results of the generator network will be texture images with texture similar to the style image of the brick wall. In this example, the style images themselves are not input to the generator network during the texture image synthesis. Rather, the generator network synthesizes texture image results based on which style image of the selection unit is selected. The generator network is pre-trained to provide these results without needing to use the style images themselves as input. In one implementation, the selection unit is a one-hot vector where each bit represents a given style image. Based simply on which bit of the vector is hot, the generator network synthesizes texture image results that are similar to whichever of the style images is associated with the hot bit. In this example, the knowledge about the texture of each of the multiple style images is already included in the generator network based on the prior training of the generator network. Thus, in this example, the style images themselves are used only during training of the generator network. Using a generator network that is pre-trained to synthesize texture images for different style image selections allows results to be synthesized more quickly and using less storage and processing resources than would otherwise be required.

Other techniques are additionally or alternatively used to facilitate using a single generator network to synthesize texture images that are similar to a selected style image of multiple style images. One such technique involves using style loss in training the generator network. During the training of the generator network, the generator network parameters are adjusted to minimize differences between the texture of output texture images and the texture of the style image. This is referred to herein as minimizing style loss. During training, the generator network produces a texture image result, the texture image result is compared with the style image to determine style loss (i.e., by measuring texture similarity), and the generator network is adjusted accordingly. This adjustment process can repeat until the generator network is configured to produce texture image results with similar texture to the style image. In the case of multiple style images, the training process is performed for each of the multiple style images. In this way, the generator network is configured to synthesize texture image results for each of the multiple style images.

One technique involves training the generator network to synthesize texture images with texture similar to a style image by assessing the style loss using a second neural network. This second neural network is referred to herein as the loss network. The loss network is a deep neural network in which each layer has a set of filters that acts as a detector for a part of the image. The filters of the loss network are sufficiently numerous that the spatial arrangements of colors in most or all patterns and designs will activate associated filters in the loss network. When a given image is input into the loss network, particular filters of the loss network are activated based on the image. The activations in the loss network filters form a set of filtered images, i.e., feature maps, for the image. These feature maps are matrices of values that represent the appearance of the image in different locations and scales. Higher layer filters represent the appearance in larger portions of the image than lower layer filters. Mid layer filters in the loss network generally represent the appearance attributes of an image's pattern or spatial arrangement of colors that reveal the image's texture. Accordingly, the relationships between feature maps of the mid layer filters are assessed to determine the texture of the image. For example, the relationships between the feature maps may reveal that an image has relatively solid color brick-shaped regions each surrounded by a border region of a different, relatively solid color. The brick texture is captured in the relationships between the feature maps for the different image regions. The texture of an image can thus be determined in a measurable way by determining correlations between the different feature maps of the image. These feature map correlations can be determined by computing the inner products between the various pairs of feature maps in certain layers of the loss network to form matrices, i.e., Gram matrices. These matrices are determined for an image and effectively describe the texture of the image. Differences in the matrices that are determined for two different images can thus be compared to determine the texture similarity/difference between the two images. In the context of training a generator network to synthesize texture images, the difference in the matrices for a texture image result and the style image provide a measure of the style loss. The generator network is trained to minimize this style loss and thus to produce texture images with similar texture to a selected style image.

As described above, the correlations between the feature maps that represent an image's texture can be determined by directly computing correlations between pairs of feature maps to form matrices, i.e., Gram matrices. However, alternative techniques for determining feature map correlations can provide benefits, particularly in the context of a generator network that synthesizes texture images for a selected style image of multiple style images. The feature maps of the multiple style images can be vastly different from one another in terms of scale. The numeric values of the feature maps of one style image may be significantly higher on average than those of another style image. These differences could require a significant amount of extra training of the generator network to allow it to produce results for the different style images. The differences in scale will result in certain style images having relatively larger style losses in the training process. Unless addressed, such differences will result in the training processes spending more effort optimizing for style images with the larger loss while ignoring other style images. For example, the training process may spend more effort training the generator network to produce texture images similar to a brick wall than it spends training the generator network to produce texture images similar to a leafy tree simply because of the different scales involved. As a result, the overall training process will take longer and be less accurate with respect to producing texture images using some of the styles images.

Techniques of the invention address these and other issues by using a covariance matrix-based style loss. Covariance matrices are used to identify correlations between feature maps at certain layers of an image after adjusting the feature maps to account for their different scales. Specifically, the feature maps are adjusted by reducing each feature map using the mean value of all feature maps in the corresponding layer. The correlations are determined by computing the inner products between the various pairs of feature maps in certain layers of the loss network but with the feature maps reduced using a mean value reduction. The resulting matrix is referred to herein as covariance matrix. The mean value reduction in the covariance matrix determination reduces the interference otherwise caused by differences in the style images. Style loss determined using covariance matrices more accurately represents the texture similarity between texture image results and the corresponding individual style images. As a result, the generator network can be trained more quickly and accurately to synthesize texture images for a selected style image of multiple style images.

Techniques disclosed herein additionally or alternatively improve the diversity amongst the texture images that are synthesized. Diversity amongst the texture images is encouraged using diversity loss during the training of the generator network. During training, texture image results of the generator network are compared with one another to determine how different the results are from one another. The generator network is adjusted during this training process to encourage more diversity amongst the texture image results. Thus, the diversity loss is computed to facilitate the adjustments. The diversity loss is computed using measures of the distances between individual texture image results. For example, each texture image result can be compared with another, randomly-chosen texture image result. The distance between these texture image results can be computed by comparing features maps of the texture images extracted from the texture images using a neural network. Thus, during training, the generator network can produce results, the results can be compared to determine diversity loss using another neural network, and the generator network adjusted accordingly. This adjustment process can repeat until the generator network is configured to produce texture image results with significant variations.

Techniques disclosed herein train a generator network using both style loss and diversity loss. During such a training process, the training configures the generator network to minimize the style loss and the diversity loss. In one embodiment, the same loss network is used for the style loss and the diversity loss determinations during the training process. Different layers of the loss network can be used for the diversity loss than for the style loss to encourage the texture results to be similar to the style image in certain ways but different from one another in certain other ways.

Techniques disclosed herein provide numerous advantages over prior techniques. The techniques enable the use of a single generator network to synthesize texture images from multiple style images. Unlike existing techniques, which use one network for one style image, the techniques disclosed herein significantly reduce the training workload and memory usage, while improving running efficiency. In addition, the use of diversity loss enables the synthesis of different results with large variations for each style image. This gives users more and different options to choose from.

Terminology

As used herein, the phrase "computing device" refers to any electronic component, machine, equipment, or system that can be instructed to carry out operations. Computing devices will typically, but not necessarily, include a processor that is communicatively coupled to a memory and that executes computer-executable program code and/or accesses information stored in memory or other storage. Examples of computing devices include, but are not limited to, desktop computers, laptop computers, server computers, tablets, telephones, mobile telephones, televisions, portable data assistant (PDA), e-readers, portable game units, smart watches, etc.

As used herein, the phrase "image" refers to data representing an appearance. Images can represent solid colors, patterns, real objects, artificial objects, scenes, and numerous other things. Images can be captured using cameras and other image capture devices, generated by computers, created by artists and other users, and created in various other ways. Images can be, but are not necessarily, composed of pixels arranged in a rectangular array with a certain height and width. Each pixel can consist of one or more bits of information, representing the brightness of the image and/or the color of the image at that point.

As used herein, the phrase "style image" refers to any image that is used as a source for synthesizing another image. Embodiments disclosed herein synthesize texture images results based on style images. Specifically, the texture image results are synthesized to have texture that is similar to a style image. A style image can include data representing any type of solid color, pattern, object, scene, thing, or combination of such elements.

As used herein, the phrase "texture" refers to the visually recognizable characteristics that occur based on a pattern or other spatial arrangement of color in an image. For example, images of a brick wall, a stone pathway, and a leaf covered forest floor each include spatial arrangements of colors that result in visually recognizable characteristics. Two images can have similar texture but differ with respect to other characteristics. For example, an image of a brick wall with bricks of consistent size, color, shape, boundaries, and relationship to one another can have a similar texture to an image that shows bricks in which brick boundaries, shapes, colors, sizes, and relationships are less regular.

As used herein, the phrase "synthesize" refers to generating a new image from some form of image description or input. For example, a generator network can synthesize an image based on noise input and parameters of the generator network that specify how a new image will be created based on the noise input.

As used herein, the phrase "noise input" refers to random data that can be used to synthesize an image. The noise input can, but need not be, a randomly-generated vector or image. A randomly generated image can be generated by determining a random value to represent the color at each pixel of the image. As a specific example, randomly colored pixels are selected by generating a random integer value for Alpha, Red, Green, and Blue components of image pixels.

As used herein, the phrase "selection unit input" refers to an input to a neural network that controls the determinations or outcomes performed by the neural network. For example, a one hot vector can be used to control the synthesis of images performed by a generator network. In this example, the generator network generates images with characteristics that depend on which bit of the one hot vector is hot.

As used herein, the phrase "generator network" refers to a neural network configured to synthesize an image.

As used herein, the phrase "loss network" refers to a neural network in which each layer has a set of filters that acts as a detector for a part of an input image. The filters of the loss network are generally sufficiently numerous such that the spatial arrangements of colors in most or all patterns and designs will activate associated filters in the loss network. When a given image is input into a loss network, particular filters of the loss network are activated based on the image. The activations in the loss network filters form a set of filtered images, i.e., feature maps, for the image. These feature maps are matrices of values that represent the appearance of the image in different locations and scales. A loss network can be used to determine the texture loss in an image by comparing feature map correlations of two images to determine how much the textures of the two images differ. A loss network can additionally or alternatively be used to determine diversity loss amongst images to determine how much the images differ from one another with respect to a particular layer or layers of the loss network.

As used herein, the phrase "style loss" refers to a measure of texture difference between output images of an image synthesis process and one or more style images. Various techniques for determining style loss are disclosed herein.

As used herein, the phrase "diversity loss" refers to a measure of differences amongst output images of an image synthesis process. Various techniques for determining diversity loss are disclosed herein.

Exemplary Computing Environment

FIG. 1 is a diagram of an environment 100 in which one or more embodiments of the present disclosure can be practiced. The environment 100 includes a creative apparatus that supports various creative functions performed by users using one or more user devices, such as a user device 102A up to a user device 102N. The creative functions, for example, can enable users to view, create, and/or edit electronic content that has a surface or other appearance attribute that is based on a texture image created by the user based on a style image selection.

Each of the user devices is connected to a creative apparatus 108 via a network 106. Users of the user devices 102 uses various products, applications, or services supported by the creative apparatus 108 via the network 106. The user devices 102 correspond to various users. Examples of the users include, but are not limited to, creative professionals or hobbyists who use creative tools to generate, edit, track, or manage creative content, end users, administrators, users who use document tools to create, edit, track, or manage documents, advertisers, publishers, developers, content owners, content managers, content creators, content viewers, content consumers, designers, editors, any combination of these users, or any other user who uses digital tools to create, view, edit, track, or manage digital experiences.

Digital tool, as described herein, includes a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 108.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices 102A-N include, but are not limited to, a personal computer (PC), a tablet computer, a desktop computer, a processing unit, any combination of these devices, or any other suitable device having one or more processors. Each user device includes at least one application supported by the creative apparatus 108.

It is to be appreciated that following description is now explained using the user device 102A as an example and any other user device can be used.

Examples of the network 106 include, but are not limited to, internet, local area network (LAN), wireless area network, wired area network, wide area network, and the like.

The creative apparatus 108 includes one or more engines for providing one or more digital experiences to the user. The creative apparatus 108 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. The creative apparatus 108 also includes a data storage unit 112. The data storage unit 112 can be implemented as one or more databases or one or more data servers. The data storage unit 112 includes data that is used by the engines of the creative apparatus 108.

A user of the user device 102A visits a webpage or an application store to explore applications supported by the creative apparatus 108. The creative apparatus 108 provides the applications as a software as a service (SaaS), or as a standalone application that can be installed on the user device 102A, or as a combination. The user creates an account with the creative apparatus 108 by providing user details and also by creating login details. Alternatively, the creative apparatus 108 can automatically create login details for the user in response to receipt of the user details. In some embodiments, the user is also prompted to install an application manager. The application manager enables the user to manage installation of various applications supported by the creative apparatus 108 and also to manage other functionalities, such as updates, subscription accounts and the like, associated with the applications. The user details are received by a user management engine 116 and stored as user data 118 in the data storage unit 112. In some embodiments, the user data 118 further includes account data 120 under which the user details are stored.

The user can either opt for a trial account or can make payment based on type of account or subscription chosen by the user. Alternatively, the payment can be based on a product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid.

The user then installs various applications supported by the creative apparatus 108 via an application download management engine 126. Application installers or application programs 128 present in the data storage unit 112 are fetched by the application download management engine 126 and made available to the user directly or via the application manager. In one embodiment, all application programs 128 are fetched and provided to the user via an interface of the application manager. In another embodiment, application programs 128 for which the user is eligible based on user's operational profile are displayed to the user. The user then selects the application programs 128 or the applications that the user wants to download. The application programs 128 are then downloaded on the user device 102A by the application manager via the application download management engine 126. Corresponding data regarding the download is also updated in the user operational profile 122. An application program 128 is an example of the digital tool. The application download management engine 126 also manages the process of providing updates to the user device 102A.

Upon download, installation and launching of an application program, in one embodiment, the user is asked to provide login details. A check is again made by the user management engine 116 and the entitlement engine 124 to ensure that the user is entitled to use the application program. In another embodiment, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace.

The application program data 130 includes one or more assets 140. The assets 140 can be a shared asset which the user wants to share with other users or which the user wants to offer on a marketplace. The assets 140 can also be shared across multiple application programs 128. Examples of the assets 140 include, but are not limited to, texture images 142, which can be synthesized using texture synthesis engine 134. For example, texture synthesis engine 134 can use one or more neural networks 172 to synthesis the texture images 142 based on user input. In one example, a generator network of the neural networks 172 is trained using style images 174 to synthesize texture images similar to one of the style images 174 based on user input selecting one of the style images 174.

The application program data 130 also include project data 154 and workspace data 156. In one embodiment, the project data 154 includes the assets 140. In another embodiment, the assets 140 are standalone assets. Similarly, the workspace data 156 can be part of the project data 154 in one embodiment while it may be standalone data in another embodiment.

In some embodiments, the user interaction with the application programs 128 is also tracked by an application analytics engine 158 and stored as application analytics data 160. The application analytics data 160 includes, for example, usage of a tool, usage of a feature, usage of a workflow, usage of the assets 140, and the like. The application analytics data 160 can include the usage data on a per user basis and can also include the usage data on a per tool basis or per feature basis or per workflow basis or any other basis. The application analytics engine 158 embeds a piece of code in the application programs 128 that enables an application program to collect the usage data and send it to the application analytics engine 158. The application analytics engine 158 stores the usage data as the application analytics data 160 and processes the application analytics data 160 to draw meaningful output. For example, the application analytics engine 158 can draw an output that the user uses "Tool 4" a maximum number of times. The output of the application analytics engine 158 is used by a personalization engine 162 to personalize the tool menu for the user to show "Tool 4" on top. Other types of personalization can also be performed based on the application analytics data 158. In addition, the personalization engine 162 can also use the workspace data 156 or the user data 118 including user preferences to personalize one or more application programs 128 for the user.

In some embodiments, the application analytics data 160 includes data indicating status of a project of the user. For example, if the user was preparing an article in a digital publishing application and what was left was publishing the prepared article at the time the user quit the digital publishing application then the application analytics engine 158 tracks the state. Now when the user next opens the digital publishing application on another device then the user is indicated the state and the options are provided to the user for publishing using the digital publishing application or any other application.

The creative apparatus 108 also includes a community engine 164 which enables creation of various communities and collaboration among the communities. A community, as described herein, includes a group of users that share at least one common interest. The community can be closed, i.e. limited to a number of users, or can be open, i.e. anyone can participate. The community enables the users to share each other's work and comment or like each other's work. The work includes the application program data 140. The community engine 164 stores any data corresponding to the community, such as work shared on the community and comments or likes received for the work as community data 166. The community data 166 also includes notification data and is used for notifying other users by the community engine in case of any activity related to the work or new work being shared. The community engine 164 can provide collaborative workflows to the user. For example, the user can create an image and can request for some expert opinion or expert editing. An expert user can then either edit the image as per the user liking or can provide expert opinion. In collaborative workflows, each of a plurality of users are assigned different tasks related to the work.

The creative apparatus 108 also includes a marketplace engine 168 for providing a marketplace to one or more users. The marketplace engine 168 enables the user to offer an asset for sale or use. The marketplace engine 168 has access to the assets 140 that the user wants to offer on the marketplace. The creative apparatus 108 also includes a search engine 170 to enable searching of the assets 140 in the marketplace. The search engine 170 is also a part of one or more application programs 128 to enable the user to perform search for the assets 140 or any other type of the application program data 130. The search engine 170 can perform a search for an asset using the metadata 142 or the file.

It is to be appreciated that the engines and working of the engines are described as examples herein and the engines can be used for performing any step in providing a digital experience to the user.

Embodiments of the invention provide techniques, systems, and computer-readable mediums with stored instructions that enable synthesizing an image with similar texture to a selected style image. The functions involved in these embodiments of the invention generally involve training a generator network to synthesize texture images depending on input selecting a selected style image of multiple style images and synthesizing texture images using the generator network based on which of the multiple style images is selected. The function of training the generator network generally involves adjusting the generator network parameters to minimize style loss and/or diversity loss. The function of synthesizing texture images generally involves receiving user input selecting a selected style image of the multiple style images and synthesizing one or more texture images based on that input. In one example, selection unit input is determined based on the selected style image and used as input, along with a noise input, to synthesize a texture image. These functions are generally implemented on one or more computing devices that use one or more processors to execute algorithms of one or more operations defined in stored instructions. The computing devices that perform these functions can be located on a user's local computing device, such as on user device 102A, or on a remote computing device, such as on creative apparatus 108 of FIG. 1. The operations of various exemplary algorithms that can be employed to perform these functions are discussed throughout this specification.

Exemplary Techniques for Synthesizing Texture Images

Figure 2:
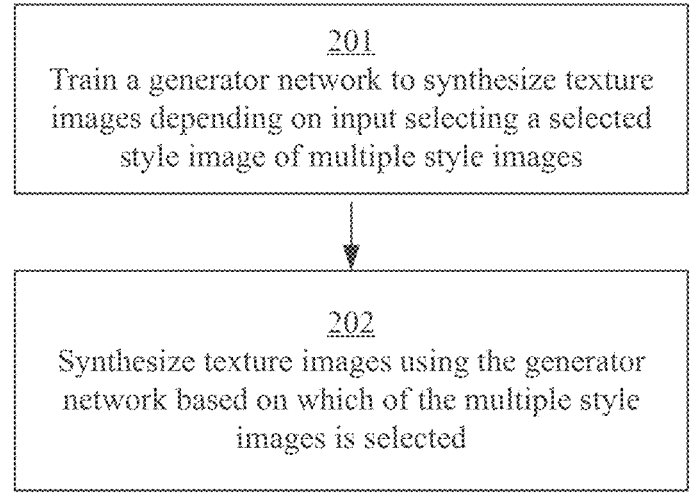
FIG. 2 is a flow chart illustrating an exemplary technique for training a generator network and synthesizing texture images using the generator network.

FIG. 2 is a flow chart illustrating an exemplary technique 200 for training a generator network and synthesizing texture images using the generator network. The exemplary technique 200 can be implemented by user device 102A and/or creative apparatus 108, although other devices and configurations can also be implemented. The exemplary technique 200 can be implemented by storing and executing instructions in a non-transitory computer-readable medium. Reference to the technique 200 being performed by a computing device includes the technique 200 being performed by one or more computing devices.

Technique 200 involves training a generator network to synthesize texture images depending on input selecting a selected style image of multiple style images, as shown in block 201. The training process can involve using the multiple style images to configure the parameters of the generator network. For example, the training can involve determining parameters of the generator network that are determined to produce results with particular characteristics. These characteristics can be selected to represent desired features such as texture similarity to one of the multiple style images, diversity amongst the results, etc.

Given a trained generator network, technique 200 synthesizes texture images using the generator network based on which of the multiple style images is selected, as shown in block 202. For example, a user interface may present thumbnails or other representations of the multiple style images and receive input from a user selecting one of the style images to use to synthesize one or more texture images with similar texture. Based on the configuration of the generator network, the generator network will synthesize a result texture image that has a texture similar to the texture of the selected style image.

Figure 3:
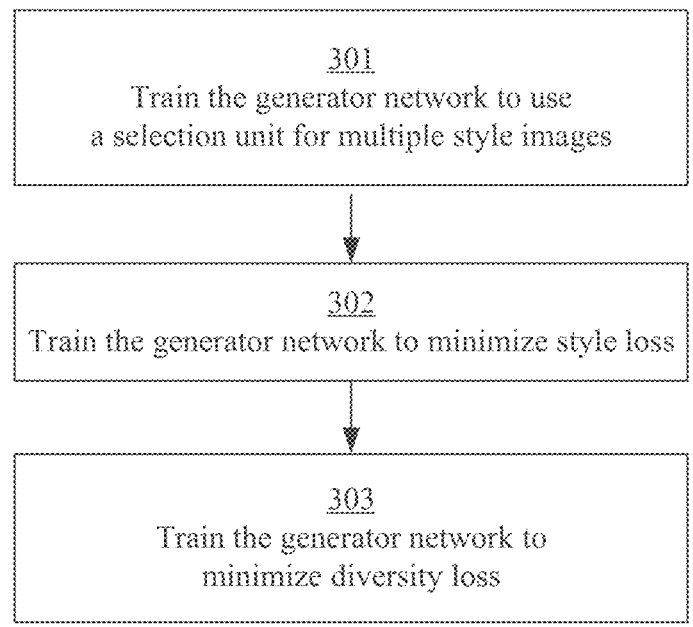
FIG. 3 is a flow chart illustrating an exemplary technique for training a generator network.

FIG. 3 is a flow chart illustrating an exemplary technique 300 for training a generator network. The exemplary technique 300 can be implemented by user device 102A or creative apparatus 108, although other devices and configurations can also be implemented. The exemplary technique 300 can be implemented by storing and executing instructions in a non-transitory computer-readable medium. Reference to the technique 300 being performed by a computing device includes the technique 300 being performed by one or more computing devices.

Technique 300 involves training the generator network to use a selection unit for multiple style images, as shown in block 301. For example, this can involve configuring parameters of the generator network by producing results given different selections by the selection unit and applying different criteria to each of the selections to determine how to configure the parameters. For example, this can involve determining parameters of the generator network that are determined to produce results with particular characteristics for each of the selections. For example, the generator network can be configured to minimize an expected loss where the respective portion of the loss is determined differently for each style image selection. Given a first style image selection in the selection unit, the loss is determined with criteria specific to the first style image, given a second style image selection in the selection unit, the loss is determined with criteria specific to the second style image, etc. The training can involve configuring parameters to minimize the total loss for all of the multiple styles. In this way, the generator network is trained to synthesize texture images for style images based the selection in the selection unit input.

Blocks 302 and 303 illustrate training the generator network to minimize style loss and diversity loss respectively. The style loss provides a measure, given a selection unit input for a selected style image, of how similar the texture of result texture images from the generator network will be to that selected style image. Training a generator network to minimize such style loss, as shown in block 302, can involve an iterative process. The iterative process can involve using the generator network to synthesize texture image results, determining style loss using those results, and then adjusting the generator network parameters to improve the texture similarity. The process can iterate a specified number of times or until a condition is detected, e.g., style loss drops below a particular threshold, that signals a desired level of similarity.

The diversity loss provides a measure, given a selection unit input for a selected style image, of how different the result texture images of the generator network will be from one another. Diversity loss can thus be used to enforce significant variations amongst the texture image results of the generator network. The diversity loss encourages the texture image results to be different from each other and prevents the generator network from being trapped in a degraded solution—producing similar results regardless of the different noise use synthesize the results. Training a generator network to minimize such diversity loss, as shown in block 303, can involve an iterative process. The iterative process can involve using the generator network to synthesize texture image results, determining diversity loss using those results, and then adjusting the generator network parameters to improve the diversity amongst the texture results. The process can iterate a specified number of times or until a condition is detected, e.g., diversity loss drops below a particular threshold, that signals a desired level of diversity.

While technique 300 illustrates training the generator unit separately with respect to the selection unit input, style loss, and diversity loss, embodiments of the invention combine the training of the generator network with respect to some or all of these features. For example, a combined loss function can account for both style loss and diversity loss, as well as for the different selection unit inputs. Training a generator network to minimize the combined loss function can involve an iterative process of using the generator network to synthesize texture image results, determining style loss and diversity loss using those results, determining the combined loss based on the style loss and diversity loss, and then adjusting the generator network parameters accordingly. The process can iterate a specified number of times or until a particular condition is detected that signals a desired level of style image similarity and texture image result diversity.

Figure 4:
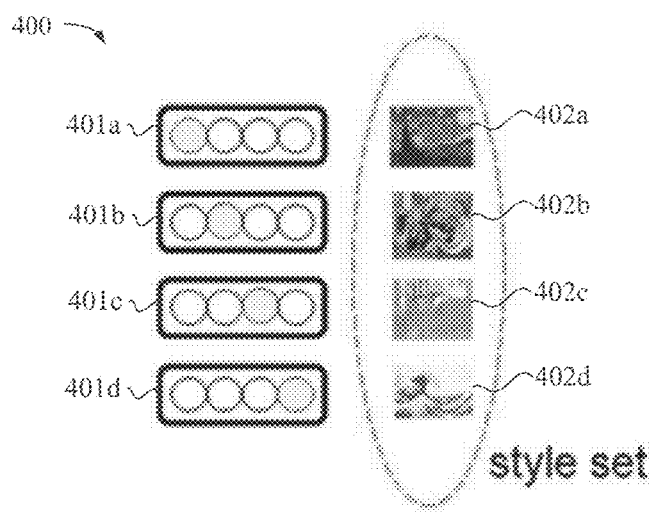
FIG. 4 is a block diagram illustrating a selection unit used to select one of four style images.

FIG. 4 is a block diagram illustrating a selection unit 400 used to select one of four style images. The selection unit 400 is used to allow the generator network to handle multiple style images as input. In this example, the selection unit 400 is a vector input. Specifically, the selection unit 400 is a one-hot vector used to identify which selected style to use to synthesize texture images each time the generator network is used. In this example, the selection unit can have one of four different conditions 401a-d. In each of the four conditions 401a-401d, a different bit of the vector is hot, corresponding to one of the style images 402a-d. during training, the bit can be chosen randomly or otherwise automatically so that the training of the generator network configures the network to generate texture images for all of the multiple image styles 402a-d. After training, the hot bit of the one hot vector is determined based on user input. For example, if the user selects style image 402a on a user interface, then the selection unit 400 is set to condition 401a.

Figure 5:
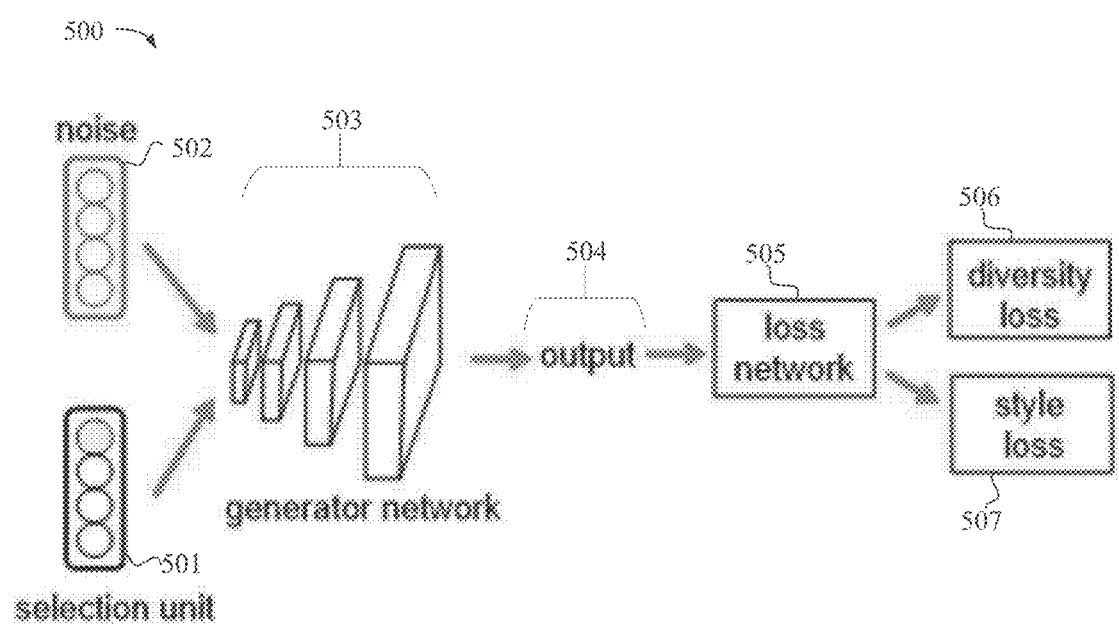
FIG. 5 is a block diagram illustrating an exemplary technique for training a generator network based on style loss and diversity loss.

FIG. 5 is a block diagram illustrating an exemplary technique 500 for training a generator network 503 based on style loss 507 and diversity loss 506. In this example, the generator network 503 has two streams of input. One branch is a noise vector 502, randomly sampled from a uniform distribution. In other embodiments, a noise input is determined by an alternative technique. The other branch input to the generator network 503 is the selection unit 501. Selection unit 501 is configured similarly to selection unit 401, with multiple bits each corresponding different style images and such that only one bit is hot at a given time.

During training, the generator network uses the noise vector 502 and selection unit 503 to synthesize output 504. The output 504 includes a batch of texture images for a style image selected by the selection unit 503 condition. The output 504 is then analyzed to determine a diversity loss 506 and a style loss 507 and the generator network configuration is adjusted accordingly. In this example, a single loss network is used to determine both the diversity loss 506 and the style loss 507. However, the loss network 505 is used in different ways for the different loss determinations. The diversity loss 506 uses the loss network to prevent the generator network 503 from producing output 504 heading to a single degraded solution in which all of the output 504 texture images in a batch are very similar to one another. The style loss 507 uses the loss function to encourage the output 504 texture images to have texture similar to one of the style images based on which of the style images is selected by the selection unit 501.

The diversity loss 506 is used to ensure that the generator network 503 does not collapse to a degraded solution where it always emits the same result (or small variations only). Using diversity loss 506, the generator network 503 is configured to synthesize different results. The following provides an example of computing diversity loss 506 using a loss network 505. Assume that there are N input samples in an output 504 batch. At each feedforward pass, the generator network 503 will emit N outputs $\{P_1, P_2, \ldots, P_N\}$. For example, five outputs 504 can be synthesized by taking five random sample vectors from random noise using the generator network. These outputs should be different from one another based on differences in the noise input 502. Differences in the noise input should produce differences in the output 504. To encourage differences within the output 504 batch based on noise differences, the $L_1$ distance between each output 504 texture image and another randomly chosen output 504 texture image is computed. Specifically, let $\{Q_1, Q_2, \ldots, Q_N\}$ be a random reordering of $\{P_1, P_2, \ldots, P_N\}$, satisfying that $P_i \neq Q_i$. The diversity loss 506 can be computed using a particular layer of the loss network L, as shown in Eq. (1).

$$L_{diversity} = \frac{1}{N} \sum_{i=1}^{N} \|L(P_i) - L(Q_i)\|_1 \quad (1)$$

In certain embodiments it is desirable to use a relatively high layer, such as the conv4_2 layer, for diversity loss 506 to encourage high level differences amongst the output 504 texture image results. In contrast, different layers, such as mid layers, of loss network can be used for the style loss 507. Equation 1 provides an example of one way to combine the differences between output 504 texture images using differences between randomly selected pairs of the outputs 504. Other combinations of differences can be used so long as the combined difference provides a measure of the diversity loss 506 amongst output 504 texture images. As the training progresses, the generator network 503 is trained to maximize diversity by minimizing the negative of the combined diversity loss 506.

The style loss 507 is used to ensure that the generator network 503 produces output 504 texture images that are similar to the style image selected by the selection unit 501. The style loss 507 can be determined using the loss network 505. The loss network 505 includes filters that are sufficiently numerous that the spatial arrangements of colors in most or all patterns and designs will activate associated filters in the loss network. When a given image is input into the loss network 505, particular filters are activated based on the image. The activations in the loss network 505 filters form a set of filtered images, i.e., feature maps, for the image. These feature maps are matrices of values that represent the appearance of the image in different locations and scales. Higher layer filters represent the appearance in large portions of the image than lower layer filters. Mid layer filters in the loss network 505 generally represent the appearance attributes of an image's pattern or spatial arrangement of colors that reveal the image's texture. The texture of an image is determined by determining correlations between the different feature maps of the image. These feature map correlations can be determined by computing the inner products between the various pairs of feature maps in certain layers of the loss network to form matrices, i.e., Gram matrices. These matrices are determined for an image and effectively describe the texture of the image. Differences in the matrices that are determined for two different images can thus be compared to determine the texture similarity between the two images. The difference in the matrices for the output 504 texture images and the style image selected by the selection unit 501 provide the style loss 507. The generator network 503 is trained to minimize this style loss 507 and thus to produce texture images with similar texture to a selected style image.

The generator network 503 can be trained to minimize both diversity loss 506 and style loss 507 together. As the diversity loss 506 is performed between output 504 texture images within the batch, the style loss 507 is computed between the current output 504 texture images and the selected style image. The selected style image is selected based on the selection unit 501 input. Therefore, during the training, the selected style image changes for the style loss 507 determination, conditioned on which bit is selected in the selection unit 501. In one example, the generator network 503 is trained using a combined loss function that is a combination of the style loss 507 and the diversity loss 506, as shown in Eq. (2) below.

$$L = \alpha L_{style} + \beta L_{diversity} \qquad (2)$$

As the training progresses, the generator network 503 is trained to minimize the combination of the style loss 507 and the diversity loss 506. To encourage more diversity, this involves minimizing a negative of the $L_{diversity}$ value. For example, this can be accomplished by using $\alpha=1$, $\beta=-1$. The negative value for $\beta$ results in encouraging maximum diversity amongst the output 504 texture images. Different values for $\alpha$ and $\beta$ can also be selected to change the relative importance of the style loss 507 and the diversity loss 506 in the combined loss determination.

The technique 500 provides numerous advantages of prior texture image synthesis techniques. For example, the technique enables the training of a single generator network 503 that can synthesize texture images similar to multiple style images. Unlike existing methods which use one generator network for one style, technique 500 significantly reduces the training workload and shows superiority in terms of memory saving and running efficiency. In addition, the use of diversity loss 506 produces a generator network 503 that is more powerful with respect to synthesizing different output 504 texture images with large variations for each style image. This gives users more options when selecting a texture image that is similar to a given style image.

Figure 6:
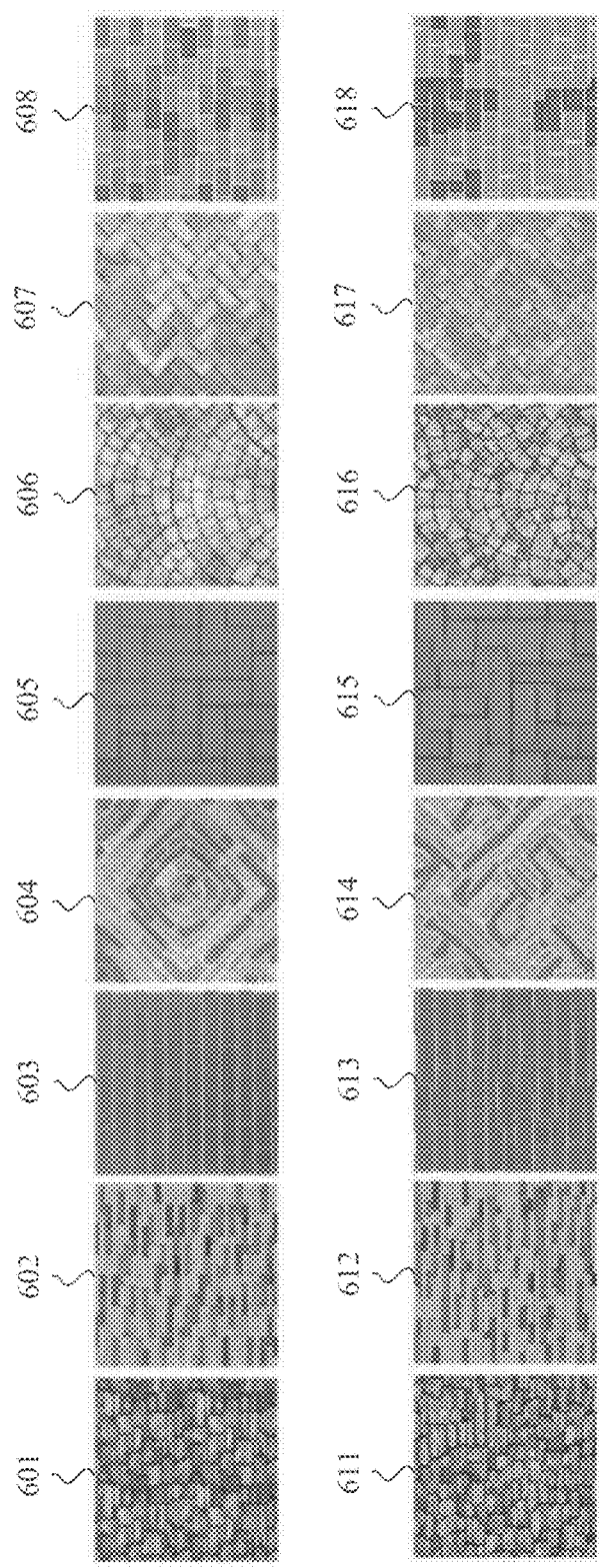
FIG. 6 illustrates a collection of style images and texture images synthesized from the style images.

FIG. 6 illustrates a collection of style images 601-608 and texture images 611-618 synthesized from the style images. A single generator network was trained to generate texture images similar to each of style images 601-608. Based on this training, a selection of a selection unit input corresponding to style image 601 results in texturally similar images such as texture image 611. A selection of a selection unit input corresponding to style image 602 results in texturally similar images such as texture image 612. A selection of a selection unit input corresponding to style image 603 results in texturally similar images such as texture image 613. A selection of a selection unit input corresponding to style image 604 results in texturally similar images such as texture image 614. A selection of a selection unit input corresponding to style image 605 results in texturally similar images such as texture image 615. A selection of a selection unit input corresponding to style image 606 results in texturally similar images such as texture image 616. A selection of a selection unit input corresponding to style image 607 results in texturally similar images such as texture image 617. A selection of a selection unit input corresponding to style image 608 results in texturally similar images such as texture image 618.

Figure 7:
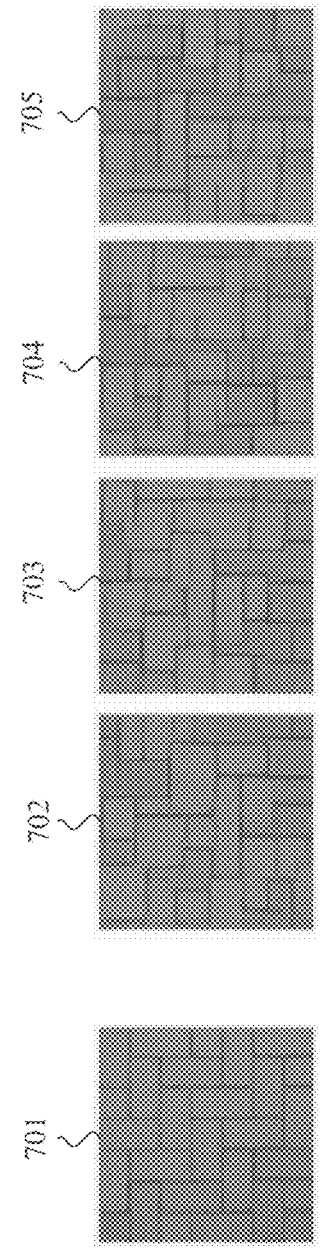
FIG. 7 illustrates a style image and four texture images synthesized from the style image.

FIG. 7 illustrates a style image 701 and four texture images 702, 703, 704, 705 synthesized from the style image. The four texture images 702, 703, 704, 705 differ from one another because the generator network used to synthesize the texture images was trained to minimize diversity loss.

Exemplary Techniques for Determining Style Loss

Figure 8:
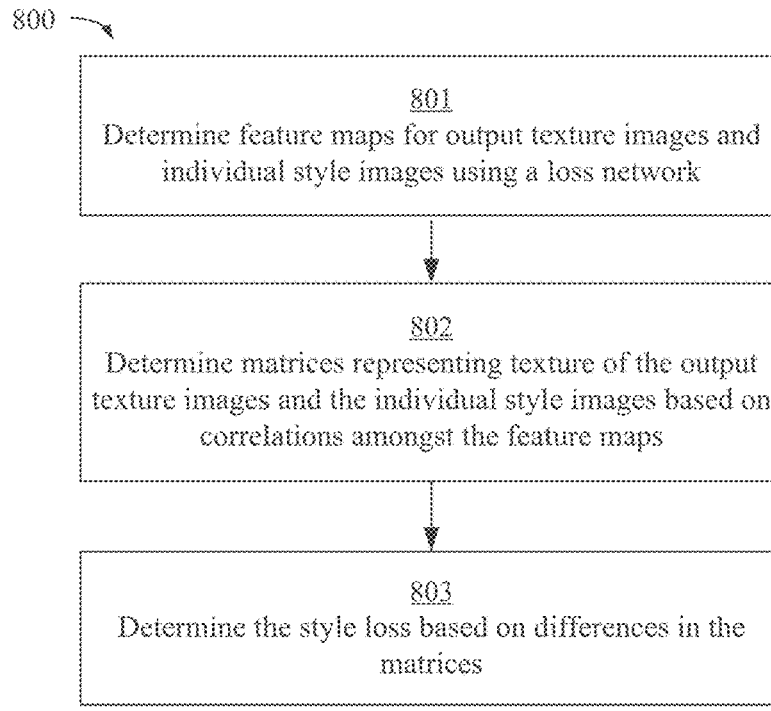
FIG. 8 is a flow chart illustrating an exemplary technique for determining style loss.

FIG. 8 is a flow chart illustrating an exemplary technique 800 for determining style loss. The exemplary technique 800 can be implemented by user device 102A or creative apparatus 108, although other devices and configurations can also be implemented. The exemplary technique 800 can be implemented by storing and executing instructions in a non-transitory computer-readable medium. Reference to the technique 800 being performed by a computing device includes the technique 800 being performed by one or more computing devices.

Technique 800 involves determining feature maps for output texture images of a generator network and feature maps for individual style images using a loss network, as shown in block 801. The loss network is a deep neural network in which each layer has a set of filters that acts as a detector for a part of the image. The filters of the loss network are sufficiently numerous that the spatial arrangements of colors in most or all patterns and designs will activate associated filters in the loss network. When a given image is input into the loss network, particular filters of the loss network are activated based on the image. The activations in the loss network filters form a set of filtered images, i.e., feature maps, for the image.

Technique 800 involves determining matrices representing texture of the output texture images and the individual style images based on correlations amongst the feature maps, as shown in block 802. The feature maps are matrices of values that represent the appearance of each image in different locations and scales. Higher layer filters represent the appearance in large portions of the image than lower layer filters. Mid layer filters in the loss network generally represent the appearance attributes of an image's pattern or spatial arrangement of colors that reveal the image's texture. Correlations between feature maps of the mid layer filters are assessed to determine the texture of each image. For example, the relationships between the feature maps may reveal that an image has relatively solid color brick-shaped regions each surrounded by a border region of a different, relatively solid color. The brick texture is captured in the relationships between the feature maps for the different image regions. The texture of an image can thus be determined in a measurable way by determining correlations between the different feature maps of the image. These feature map correlations can be determined by computing the inner products between the various pairs of feature maps in certain layers of the loss network to form matrices, i.e., Gram matrices.

Specifically, the Gram matrix is defined as follows:

$$Gram_{ij} = \sum_k F_{ik} F_{jk}$$

where $F_{ik}$ (or $F_{jk}$) is the vectorized activation of the ith filter at position k in the current layer of the loss network. Using Gram matrices provides adequate results in many circumstances such as circumstances in which a generator network is used for single style image texture synthesis. Alternative matrices, such as a covariance matrix, discussed with respect to FIG. 9, can alternatively be used and provide advantages particularly in circumstances in which a generator network is used for multiple style image texture synthesis.

After determining the matrices, technique 800 further involves determining the style loss based on differences in the matrices. Generally, technique 800 determining matrices for each texture image and style image that effectively describe the texture of the respective image. Differences in the matrices that are determined for two different images can thus be compared to determine the texture similarity/differences between the two images. The greater the texture difference, the more style loss. In one example, the texture differences between a style image and a texture image is computed by summing the differences between the respective matrices representing the texture of each of the images. The generator network is trained to minimize this style loss between texture image outputs of the generator network and the one or more style images. In this way, the generator network can be trained to produce texture images with similar texture to a selected style image.

Figure 9:
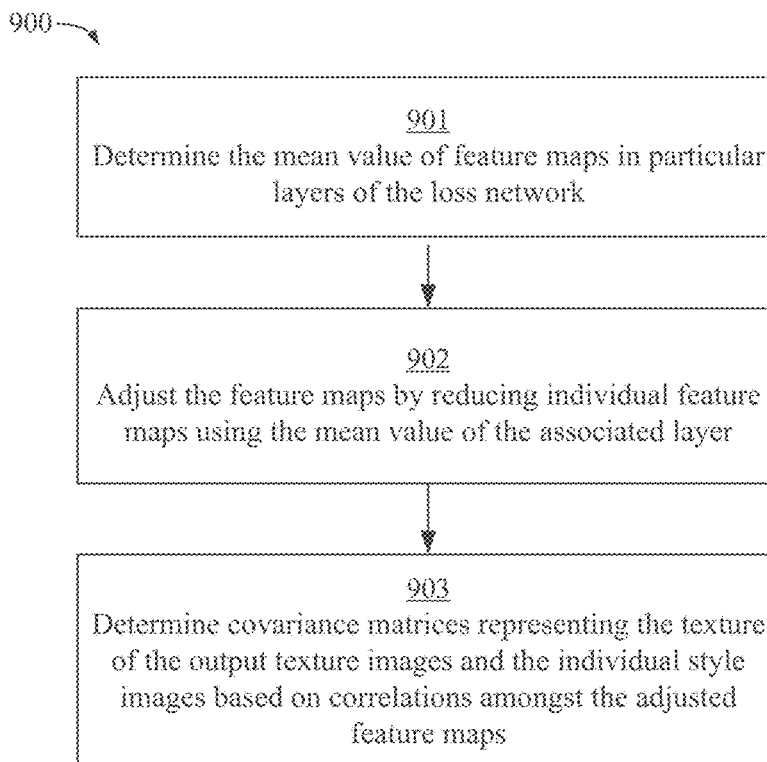
FIG. 9 is a flow chart illustrating an exemplary technique for determining covariance matrix-based style loss.

FIG. 9 is a flow chart illustrating an exemplary technique 900 for determining covariance matrix-based style loss. Technique 900 can be used to determine the matrices of block 802 of FIG. 8. Technique 900 involves determining the mean value of feature maps in particular layers of the loss network, as shown in block 901. The technique adjusts the feature maps by reducing the individual feature maps using the mean value of the associated layer, as shown in block 902. The covariance matrices are then determined to represent the texture of the output texture images and the individual style images based on correlations amongst the adjusted feature maps, as shown in block 903.

In the Covariance matrix based style loss of technique 900, the Covariance matrix is defined as follows:

$$\text{Cov}_{ij} = \sum_k (F_{ik} - \overline{F})(F_{jk} - \overline{F})$$

where $F_{ik}$ (or $F_{jk}$) is the vectorized activation of the ith filter at position k in the current layer of the loss network and $\overline{F}$ is the mean of all activations in the current layer of the loss network. The covariance matrix determination differs from the Gram matrix determination because the mean is subtracted before the inner product between two activations is determined. This is useful because the different style images may have very different value of $\overline{F}$. If the activations of each style is not re-scaled with zero mean, the generator network is likely to spend a lot of effort on the learning the different $\overline{F}$ instead of the discriminative boundary to separate, different styles images. Using covariance matrices instead of Gram matrices can provide advantages. Using the covariance matrices for style loss provides particular advantages in the context of a generator network that synthesizes texture images for a selected style image of multiple style images. The feature maps of the multiple style images can be vastly different from one another in terms of scale. The numeric values of the feature maps of one style image may be significantly higher on average than those of another style image. These differences could otherwise require a significant amount of extra training of the generator network to allow it to produce results for the different style images. These differences could also reduce the accuracy of the texture image synthesis.

In technique 900, the feature maps are adjusted by reducing each using the mean value of all feature maps in the corresponding layer. The correlations can then be determined by computing the inner products between the various pairs of feature maps in certain layers of the loss network but with the feature maps reduced using a mean value reduction. The mean value reduction in the covariance matrix determination reduces the interference otherwise caused by differences in the style images. The style loss determined using covariance matrices more accurately represents the texture similarity between texture image results and the corresponding individual style images. As a result, the generator network can be trained more quickly and the accurately to synthesize texture images for a selected style image of multiple style images. In addition, the ability to handle multiple styles in one generator network greatly reduces the otherwise heave burden of having to train one generator network for one style. The covariance matrix based style loss enables a much broader range of style image-based texture synthesis.

Figure 10:
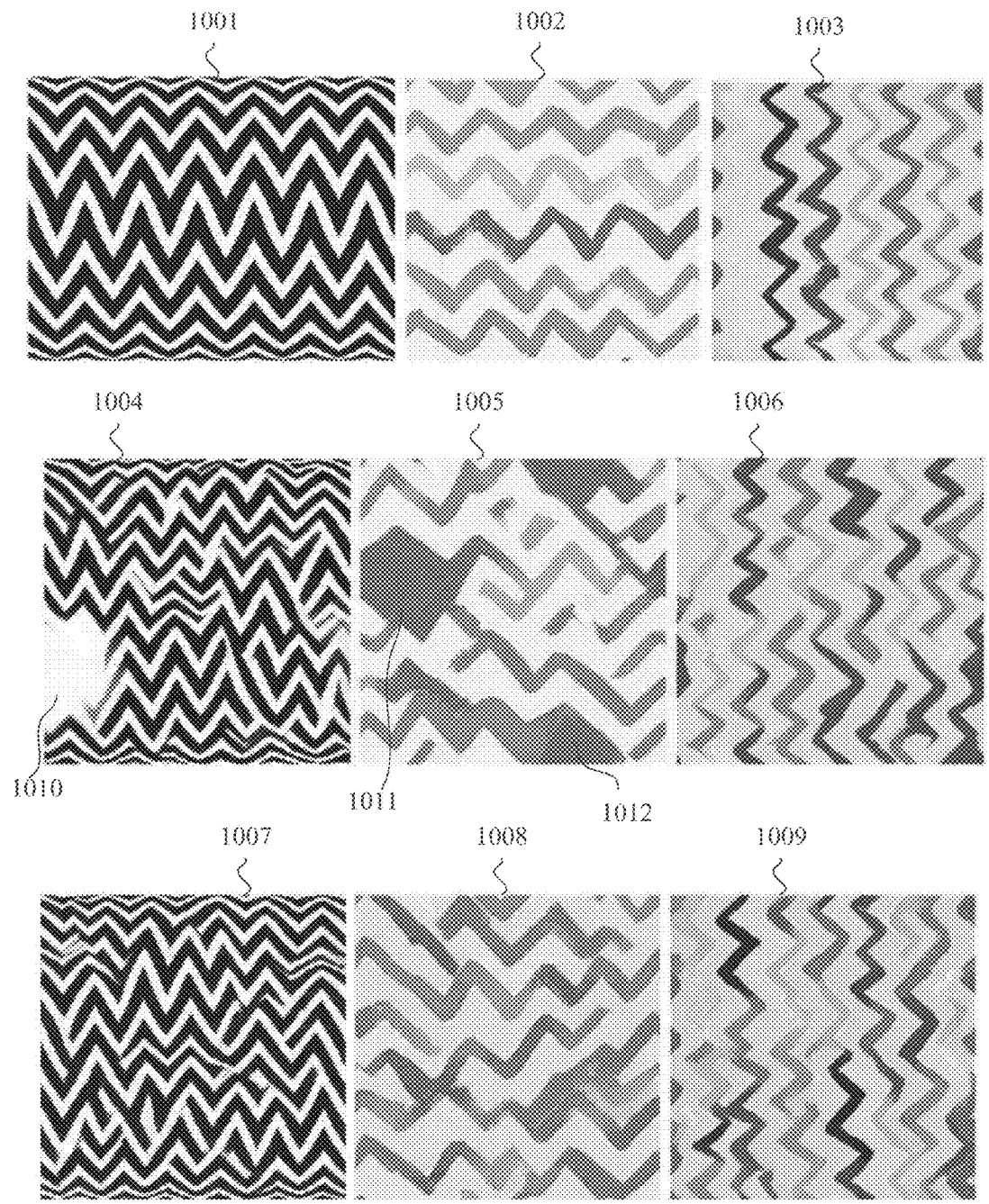
FIG. 10 illustrates a collection of style images and texture images synthesized from the style images based on Gram matrix-based style loss and covariance matrix-based style loss.
Figure 11:
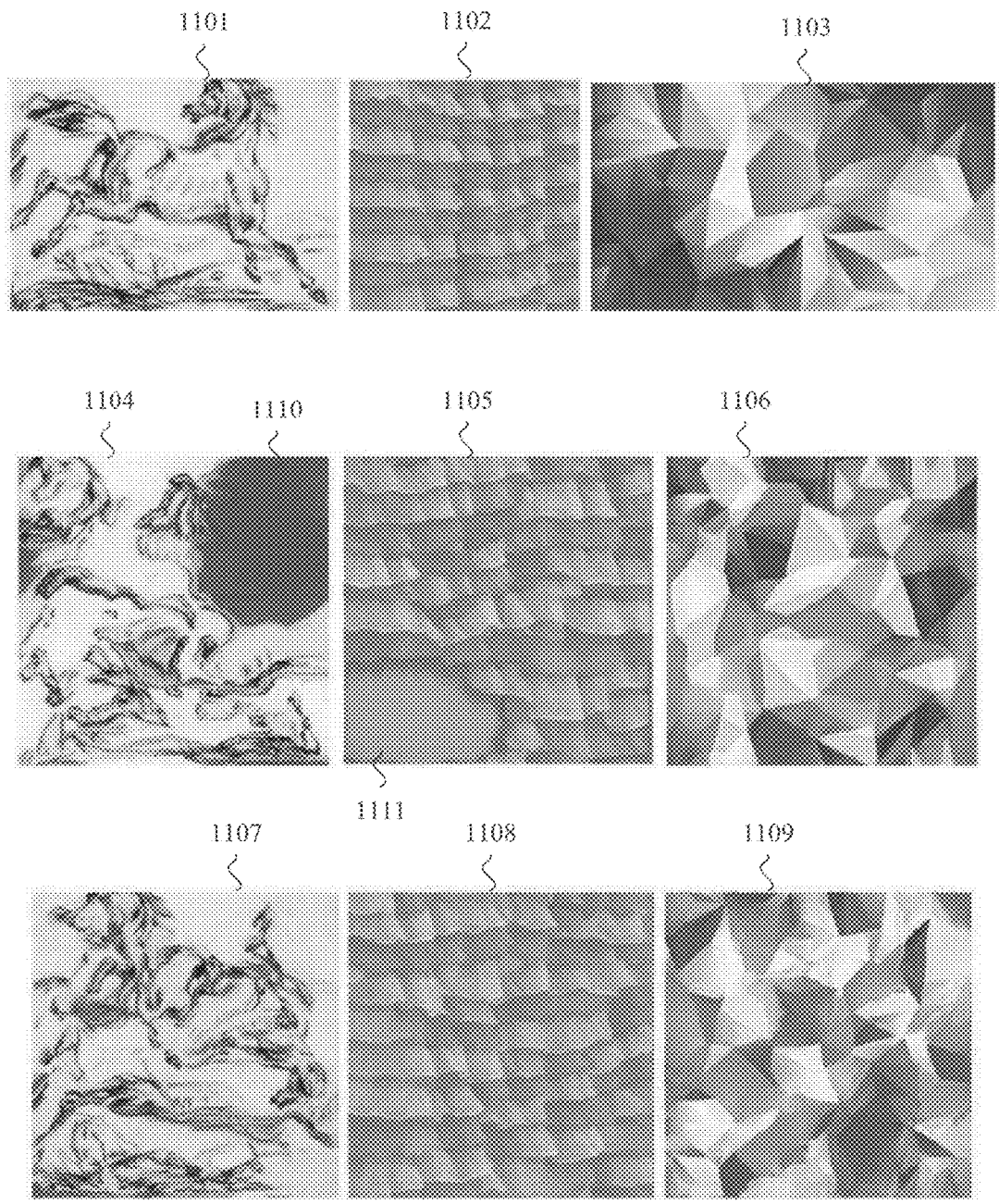
FIG. 11 illustrates another collection of style images and texture images synthesized from the style images based on Gram matrix-based style loss and covariance matrix-based style loss.

FIGS. 10 and 11 illustrate advantages to using covariance-based style loss over using Gram matrix-based style loss in certain circumstances. FIG. 10 illustrates a collection of style images 1001, 1002, 1003, a set of texture images 1004, 1005, 1006 synthesized from the style images based on Gram matrix-based style loss, and a set of images 1007, 1008, 1009 synthesized from the style images based on covariance matrix-based style loss. A single generator network was trained to produce output texture images using a selected one of the three style images 1001, 1002, 1003 using Gram matrix-based style loss. The resulting texture images 1004, 1005, 1006 include flaws, such as flawed portions 1010 and 1011. In contrast, a different single generator network was trained to produce output texture images using a selected one of the three style images 1001, 1002, 1003 using covariance matrix-based style loss. The resulting texture images 1007, 1008, 1009 more accurately represent the corresponding of the input images 1001, 1002, and 1003.

FIG. 11 also illustrates a collection of style images 1101, 1102, 1103, a set of texture images 1104, 1105, 1106 synthesized from the style images based on Gram matrix-based style loss, and a set of images 1107, 1108, 1109 synthesized from the style images based on covariance matrix-based style loss. A single generator network was trained to produce output texture images using a selected one of the three style images 1101, 1102, 1103 using Gram matrix-based style loss. The resulting texture images 1104, 1105, 1106 include flaws, such as flawed portions 1110 and 1111. In contrast, a different single generator network was trained to produce output texture images using a selected one of the three style images 1101, 1102, 1103 using covariance matrix-based style loss. The resulting texture images 1107, 1108, 1009 more accurately represent the corresponding of the input images 1101, 1102, and 1103.

Figure 12:
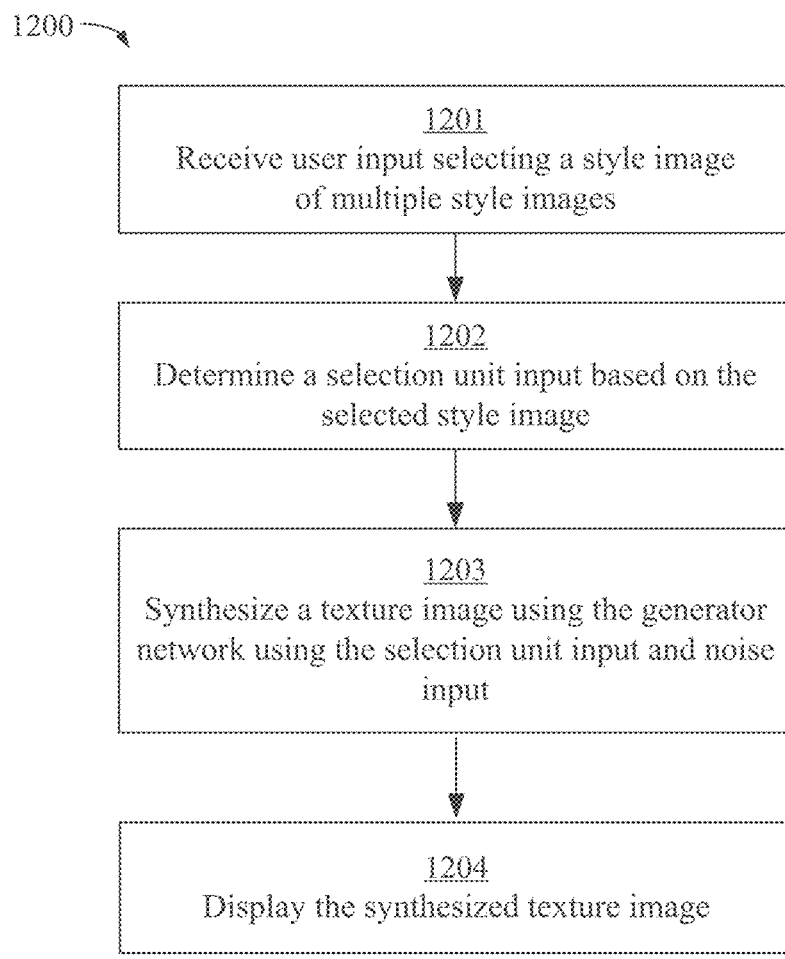
FIG. 12 is a flow chart illustrating an exemplary technique for synthesizing a texture image based on a style image selection.

FIG. 12 is a flow chart illustrating an exemplary technique for synthesizing a texture image based on a style image selection. The exemplary technique 1200 can be implemented by user device 102A and/or creative apparatus 108, although other devices and configurations can also be implemented. The exemplary technique 1200 can be implemented by storing and executing instructions in a non-transitory computer-readable medium. Reference to the technique 1200 being performed by a computing device includes the technique 200 being performed by one or more computing devices.

Technique 1200 involves receiving user input selecting a style image of multiple style images, as shown in block 1201. For example, a user interface can present style image options and receive input via a mouse-controlled cursor, touch on a touch screen, or other input device selecting one of the style images. The technique 1200 determines a selection unit input based on the selected style image, as shown in block 1202. For example, where the selection unit input is a one-hot vector, this involves setting the bit of the one-hot vector corresponding to the selected input image to be hot. The technique 1200 further involves synthesizing a texture image using the generator network using the selection unit input and a noise input, as shown in block 1203. The noise input can be a randomly determined noise vector. The generator network is pre-trained to synthesize a variety of texture image results based on different noise input and a selection in the selection unit. Technique 1200 displays the synthesized texture image, as shown in block 1204. For example, the image can be displayed in a user interface for a user to use in creating digital content, publishing, etc. The technique 1200 can involve displaying multiple, different texture images to allow a user to select from varying options. The generator network can be preconfigured, for example based on a diversity loss technique, to encourage diversity amongst the resulting texture images so that the user has a better variety of texture images to choose from.

Exemplary Computing Environment

Figure 13:
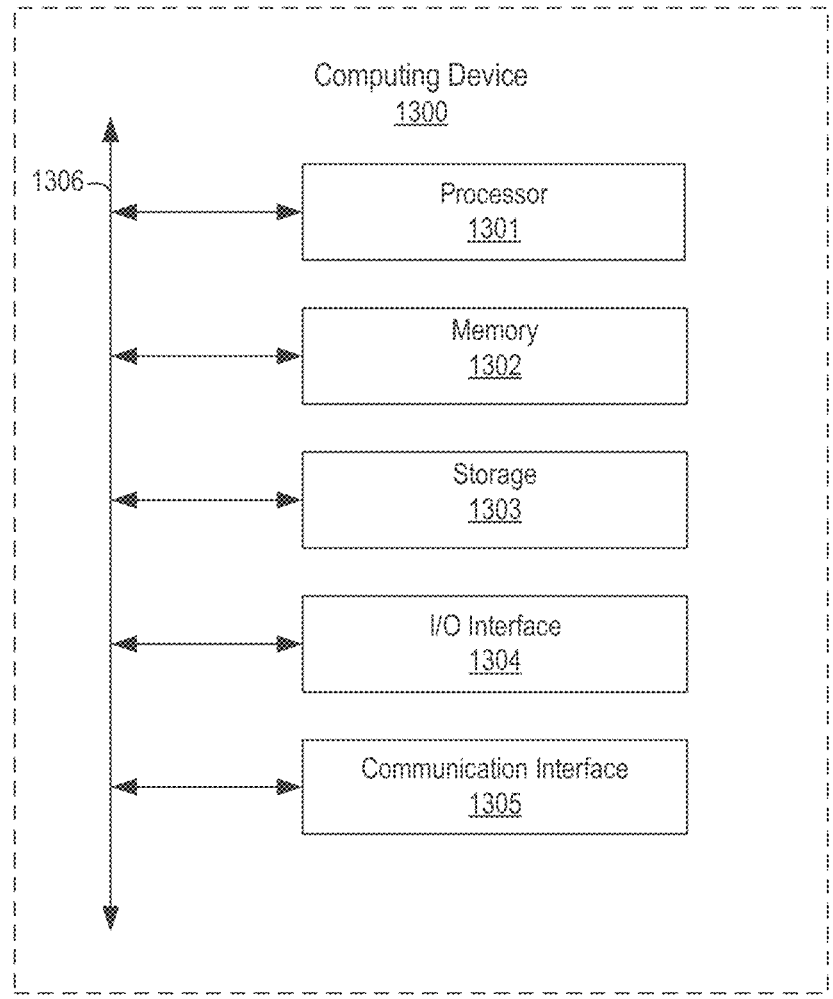
FIG. 13 is a block diagram depicting an example hardware implementation.

Any suitable computing system or group of computing systems can be used to implement the techniques and methods disclosed herein. For example, FIG. 13 is a block diagram depicting examples of implementations of such components. The computing device 1300 can include a processor 1301 that is communicatively coupled to a memory 1302 and that executes computer-executable program code and/or accesses information stored in memory 1302 or storage 1303. The processor 1301 may comprise a microprocessor, an application-specific integrated circuit ("ASIC"), a state machine, or other processing device. The processor 1301 can include one processing device or more than one processing device. Such a processor can include or may be in communication with a computer-readable medium storing instructions that, when executed by the processor 1301, cause the processor to perform the operations described herein.

The memory 1302 and storage 1303 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1300 may also comprise a number of external or internal devices such as input or output devices. For example, the computing device is shown with an input/output ("I/O") interface 1304 that can receive input from input devices or provide output to output devices. A communication interface 1305 may also be included in the computing device 1300 and can include any device or group of devices suitable for establishing a wired or wireless data connection to one or more data networks. Non-limiting examples of the communication interface 1305 include an Ethernet network adapter, a modem, and/or the like. The computing device 1300 can transmit messages as electronic or optical signals via the communication interface 1305. A bus 1306 can also be included to communicatively couple one or more components of the computing device 1300.

The computing device 1300 can execute program code that configures the processor 1301 to perform one or more of the operations described above. The program code can include one or more modules. The program code may be resident in the memory 1302, storage 1303, or any suitable computer-readable medium and may be executed by the processor 1301 or any other suitable processor. In some embodiments, modules can be resident in the memory 1302. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method, performed by a computing device, for synthesizing a texture image with similar texture to a selected style image, the method comprising:
    training a generator network to synthesize texture images depending on a selection unit input, wherein training the generator network comprises configuring the generator network to synthesize the texture images that are similar to individual style images of multiple style images based on which of the multiple style images is selected by the selection unit input;
    receiving user input selecting a selected style image of the multiple style images;
    determining the selection unit input corresponding to the selected style image, wherein determining the selection unit input identifies input to the generator network;
    synthesizing a texture image using the generator network, wherein synthesizing the texture image comprises using the selection unit input and noise input to synthesize the texture image with texture similar to the selected style image; and
    outputting the synthesized texture image, wherein the synthesized texture image comprises a newly created image that is different from the texture image.

2. The method of claim 1, wherein training the generator network comprises adjusting generator network parameters to minimize style loss in synthesizing texture images that are similar to the individual style images, wherein minimizing the style loss comprises minimizing texture differences between output texture images of the generator network and the individual style images.

3. The method of claim 2, wherein minimizing the texture differences comprises assessing the style loss using a loss network, wherein assessing the style loss using the loss network comprises:
    determining feature maps for the output texture images and the individual style images based on activations in mid-layer filters of the loss network, wherein the mid-layer filters detect spatial arrangements of colors in different image parts;
    determining matrices representing texture of the output texture images and the individual style images based on correlations amongst the feature maps; and
    determining the style loss based on differences in the matrices.

4. The method of claim 3, wherein determining the matrices comprises determining covariance matrices, wherein determining the covariance matrices comprises:
    adjusting the feature maps by reducing individual feature maps using a mean value of feature maps in an associated layer of the loss network; and
    determining the covariance matrices representing the texture of the output texture images and the individual style images based on correlations amongst the adjusted feature maps.

5. The method of claim 4, further comprising determining the correlations amongst the adjusted feature maps by computing inner products between pairs of the adjusted feature maps.

6. The method of claim 1, wherein training the generator network comprises adjusting generator network parameters to minimize diversity loss using a loss network, wherein layers of the loss network have filters that acts as detectors for spatial arrangements of colors in different image parts, wherein minimizing the diversity loss increases diversity of particular layers of the loss network amongst output texture images.

7. The method of claim 1, wherein training the generator network comprises adjusting the generator network parameters to minimize diversity loss and minimize style loss.

8. A system for synthesizing an image with similar texture to a selected style image comprising:
    a means for training a generator network to synthesize texture images depending on input selecting a selected style image of multiple style images;
    a means for synthesizing multiple texture images using the generator network based on which of the multiple style images is selected, wherein the multiple texture images are different from each other; and
    outputting the synthesized texture images, wherein the synthesized texture images comprise newly created images.

9. The system of claim 8, wherein the means for training the generator network configures the generator network to synthesize texture images that are similar to individual style images of the multiple style images based on which of the multiple style images is selected by a selection unit input.

10. The system of claim 8, wherein the means for training the generator network adjusts generator network parameters to minimize style loss in synthesizing texture images that are similar to the individual style images.

11. The system of claim 8, wherein the means for training the generator network assesses the style loss using a loss network by performing operations comprising:
    determining feature maps for output texture images and the individual style images based on activations in mid-layer filters of the loss network, wherein the mid-layer filters detect spatial arrangements of colors in different image parts;
    determining matrices representing texture of the output texture images and the individual style images based on correlations amongst the feature maps; and
    determining the style loss based on differences in the matrices.

12. The system of claim 11, wherein determining the matrices comprises determining covariance matrices, wherein determining the covariance matrices comprises:
    adjusting the feature maps by reducing individual feature maps using a mean value of feature maps in an associated layer of the loss network; and
    determining the covariance matrices representing the texture of the output texture images and the individual style images based on correlations amongst the adjusted feature maps.

13. The system of claim 12, further comprising determining correlations amongst the adjusted feature maps by computing inner products between pairs of the adjusted feature maps.

14. The system of claim 8, wherein the means for training the generator network adjusts generator network parameters to minimize diversity loss using a loss network, wherein the means for training the generator network adjusts the generator network parameters to increase diversity of particular layers of the loss network amongst output texture images.

15. The system of claim 8, wherein the means for training the generator network adjusts generator network parameters to minimize diversity loss and minimize style loss.

16. The system of claim 8, wherein the means for synthesizing texture images using the generator network:
    receives user input selecting a selected style image of the multiple style images;
    determines a selection unit input corresponding to the selected style image, wherein the selection unit input comprises input to the generator network that results in synthesizing the texture image with texture similar to the selected style image; and synthesizes a texture image using the generator network, wherein synthesizing the texture image comprises using the selection unit input and noise input to synthesize the texture image with texture similar to the selected style image.

17. The system of claim 16, wherein synthesizing the texture image based on the selection unit input comprises synthesizing the texture image based on which bit of a one-hot vector is hot, wherein the selection unit comprises the one-hot vector.

18. A non-transitory computer-readable medium storing instructions, the instructions comprising instructions for:

receiving user input selecting a selected style image of the multiple style images;

determining selection unit input for a generator network based on the selected style image;

synthesizing a texture image using the generator network, wherein synthesizing the texture image comprises using the selection unit input and noise input to synthesize the texture image with texture similar to the selected style image; and outputting the synthesized texture image, wherein the synthesized texture image comprises a newly created image that is different from the texture image.

19. The non-transitory computer-readable medium of claim 18, wherein synthesizing the texture image comprises providing the selection unit input and noise input to the generator network, the generator network having been pre-trained to synthesize texture images by minimizing covariance matrix-based style loss between synthesized texture image outputs and individual style images of the multiple style images.

20. The non-transitory computer-readable medium of claim 18, wherein synthesizing the texture image comprises providing the selection unit input and noise input to the generator network, the generator network having been pre-trained to synthesize texture images by minimizing diversity loss between synthesized texture image outputs.

* * * * *